Dec. 31, 1935.  O. C. RITZ-WOLLER  2,026,010
MAKE-UP MIRROR DEVICE
Filed March 11, 1933
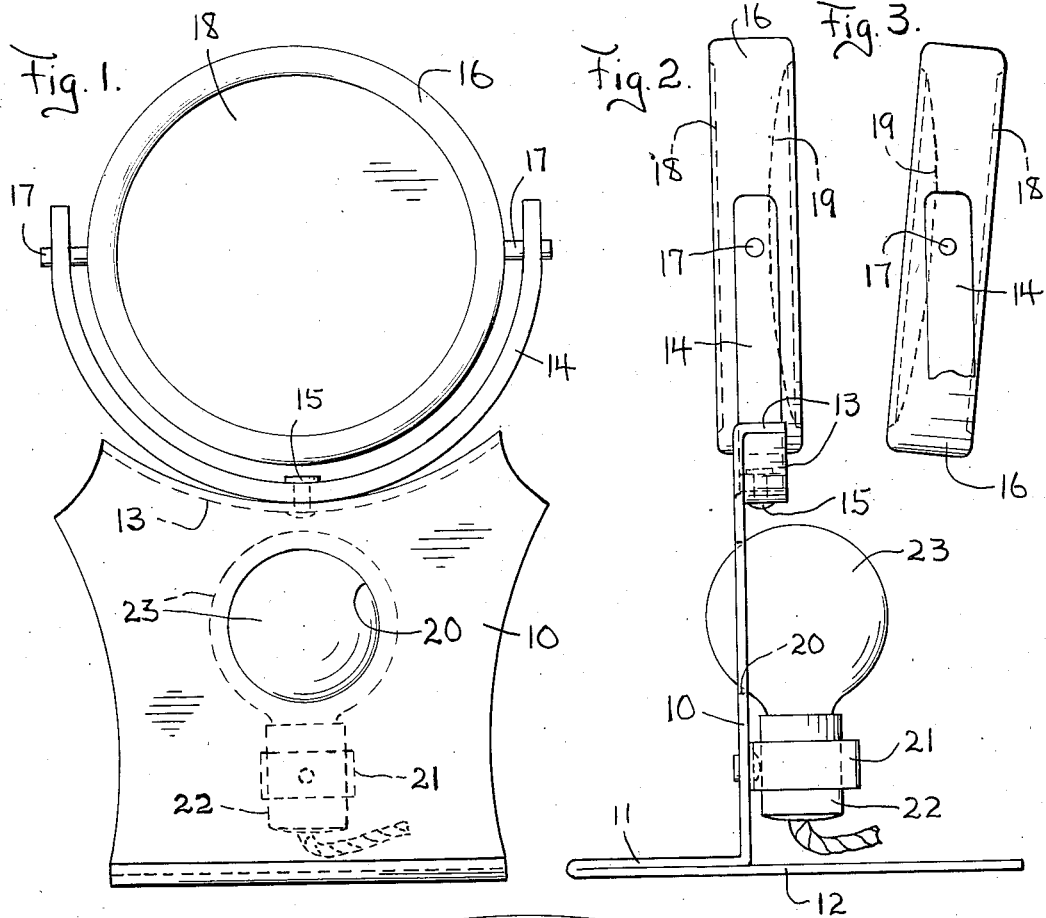
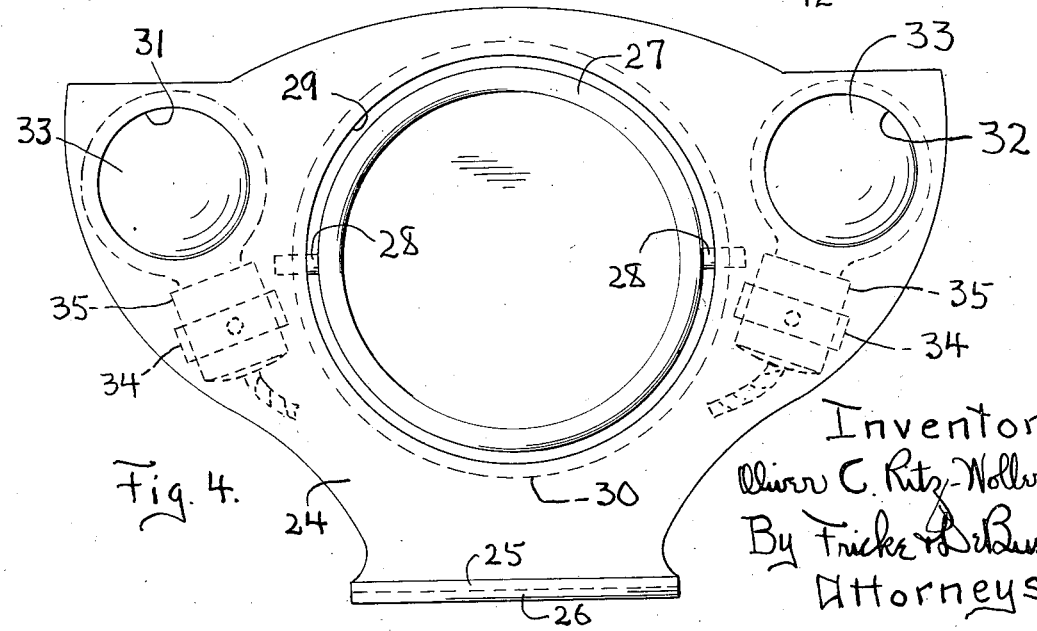

Patented Dec. 31, 1935

2,026,010

UNITED STATES PATENT OFFICE 2,026,010

MAKE-UP MIRROR DEVICE

Oliver C. Ritz-Woller, Chicago, Ill.

Application March 11, 1933, Serial No. 660,397

1 Claim. (Cl. 240—4.2)

My invention relates to make-up mirror devices and has for its object the provision of a new and improved form and arrangement of parts by which a plain mirror and a concave mirror may be adjustably supported in operative relation to an electric light bulb or other source of light, whereby with either mirror in use the mirror member may be held at the desired angle to suit the position of the user, whereby the light shall be so located as to be effective for the use of either one of the two mirrors, and whereby said two mirrors shall be capable of use alternatively to advantage from a single point without the necessity for the user to shift position with respect to the device.

It is another object of my invention to improve devices of this type in sundry details hereinafter pointed out. The preferred means by which I have accomplished my several objects are illustrated in the drawing and are hereinafter specifically described. That which I believe to be new and desire to secure by Letters Patent is set forth in the claim.

In the drawing,—

Fig. 1 is a front face view of the preferred form of my improved device;

Fig. 2 is a side view of the device shown in Fig. 1 as seen from the right in said figure;

Fig. 3 is a view similar to the upper portion of Fig. 2 but showing a changed position of the mirror member; and Fig. 4 is a front face view of a modified form of device.

Referring now to Figs. 1, 2 and 3, in which corresponding parts are indicated by the same reference characters, 10 indicates a sheet metal plate having a portion 11 bent at right angles to the plate, with still another portion 12 doubled backwardly upon the portion 11 serving as a base for supporting the plate 10 substantially in vertical position. At its upper edge portion, the plate 10 is provided with a backwardly turned flange 13 at an intermediate point of which a bowed bail 14 is pivotally mounted by means of a rivet 15, the bail 14 having its upper end portions oppositely disposed with respect to each other and substantially parallel. Between the oppositely disposed upper end portions of the bail 14, I have pivotally mounted a mirror member 16 by the use of trunnions 17 extending outwardly from the opposite side portions of the mirror member 16 into engagement with suitable bearings in the bail 14. The arrangement is such that the mirror member 16 is rotatable upon a horizontal axis in either direction without restriction between the arms of the bail 14, the fit of the trunnions 17 in their bearings being such that the mirror member is held lightly by friction in any desired adjusted angular position.

As is clearly indicated by dotted lines in Fig. 2, the mirror member 16 comprises a straight mirror 18 at one face and a concave mirror 19 at the opposite face, such mirrors being arranged in back to back relation to each other.

Below the mirror member 16, I have provided an opening 20 in the plate 10 in central position laterally of the plate, with a spring clip 21 in position beneath the opening for releasably holding a socket member 22 in position for supporting an electric light bulb 23 in rear of the plate 10 opposite the opening 20, the arrangement being such that the plate is adapted partially to shield the bulb 23 from the front.

The arrangement of my improved device is such that either mirror 18 or 19 is adapted to be used alternatively to advantage with respect to the light from the bulb 23 through the opening 20, with either the plain mirror 18 facing forwardly as shown in Fig. 2 or the mirror 19 facing forwardly as shown in Fig. 3. The mirror device can readily be shifted from one position to the other as may be desired, and the mirror member is automatically held in adjusted position until the user desires to change the adjustment. The arrangement is such that the device is adapted for use to advantage from about the same point regardless of which of the two mirrors is being used.

In Fig. 4, which shows a modified form of device, a plate 24 is employed in lieu of the plate 10, such plate 24 being held in position by means of integrally formed plate portions 25 and 26 corresponding to the parts 11 and 12 of the construction as shown in Fig. 2. A mirror member 27 similar to the mirror member 16 is held in position by means of trunnions 28 within a large opening 29 in the plate 24, the trunnions 28 being revolubly and frictionally mounted in suitable bearings in a flange 30 formed integrally with the plate 24 about the opening 29. The plate 24 is provided with two openings 31 and 32 at opposite sides of the opening 29, with electric light bulbs 33 releasably held in position in said openings by means of clips 34 engaging socket members 35 mounted on the rear face of the plate 24. The device as shown in Fig. 4 operates in substantially the same manner as is above described in connection with the device of Fig. 1, and it is believed, therefore, to be unnecessary to describe the same further herein. It will be understood that by the use of two bulbs 33 in lieu of the single bulb 23 as shown in Fig. 2, the distribution of the light is somewhat different, but the operation with respect to the adjustment of the mirror device for bringing either the plain mirror or the concave mirror to face forwardly is the same in one device as that in the other device.

Applicant does not by this application seek to cover the construction shown and described by his copending application Serial No. 660,396 filed of even date herewith.

I claim:—

In a device of the type described, the combination of a sheet metal support comprising a plate portion having an opening therein and a portion at an angle to said plate portion serving as a base for holding the plate portion in substantially vertical position, a mirror member comprising a plain mirror and a concave mirror arranged back to back, means for supporting an electric light bulb on the rear face of said plate opposite said opening so as to be partially shielded by the plate, a bowed bail member mounted at an intermediate point on the upper end portion of said plate with its arms oppositely disposed with respect to each other above the plate, and means for swingingly mounting said mirror member on a horizontal axis between said arms so as to be rotatable without restriction in either direction thereon.

OLIVER C. RITZ-WOLLER.